Aug. 13, 1940.  L. GEROSA ET AL  2,211,719
TRANSPORTING AND DUMPING VEHICLE
Filed Oct. 27, 1938  5 Sheets-Sheet 2
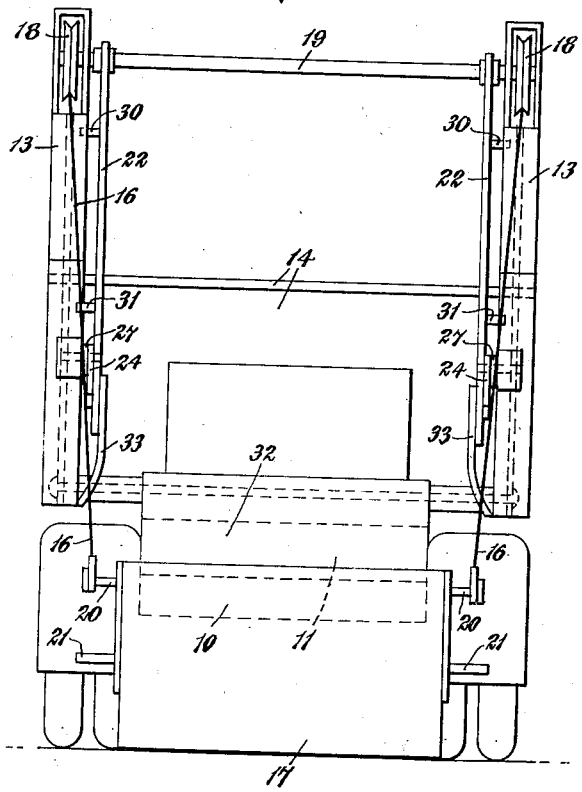
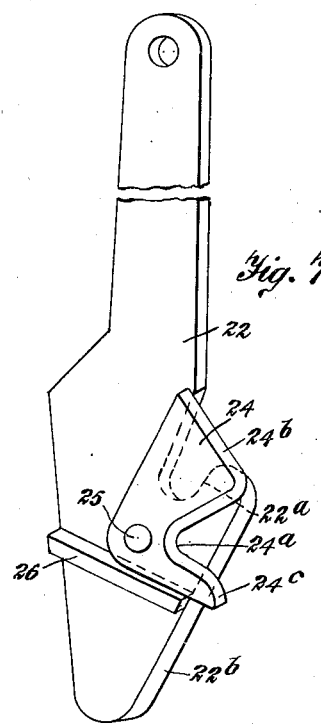
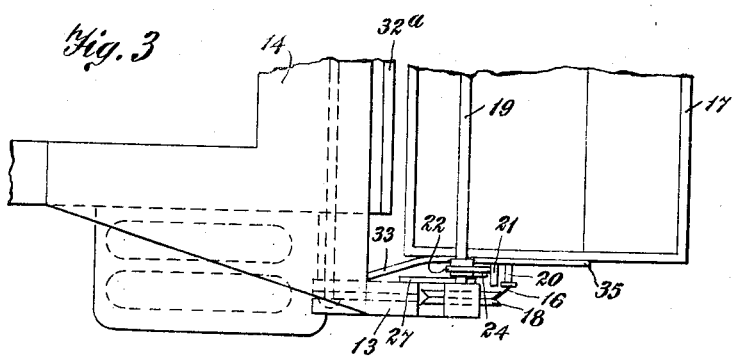
INVENTORS
LAWRENCE GEROSA
GEORGE P. WAGNER
BY
ATTORNEY.

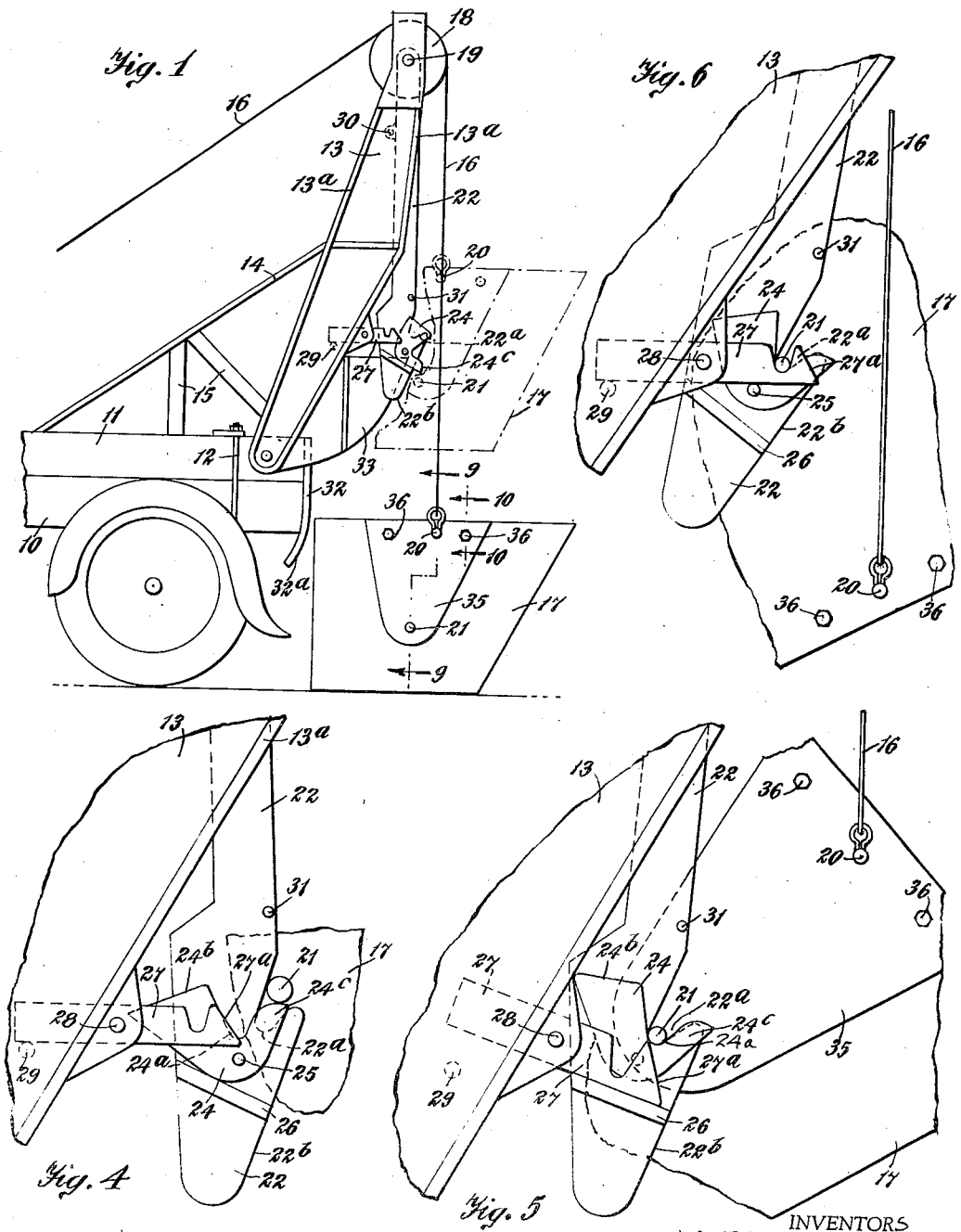

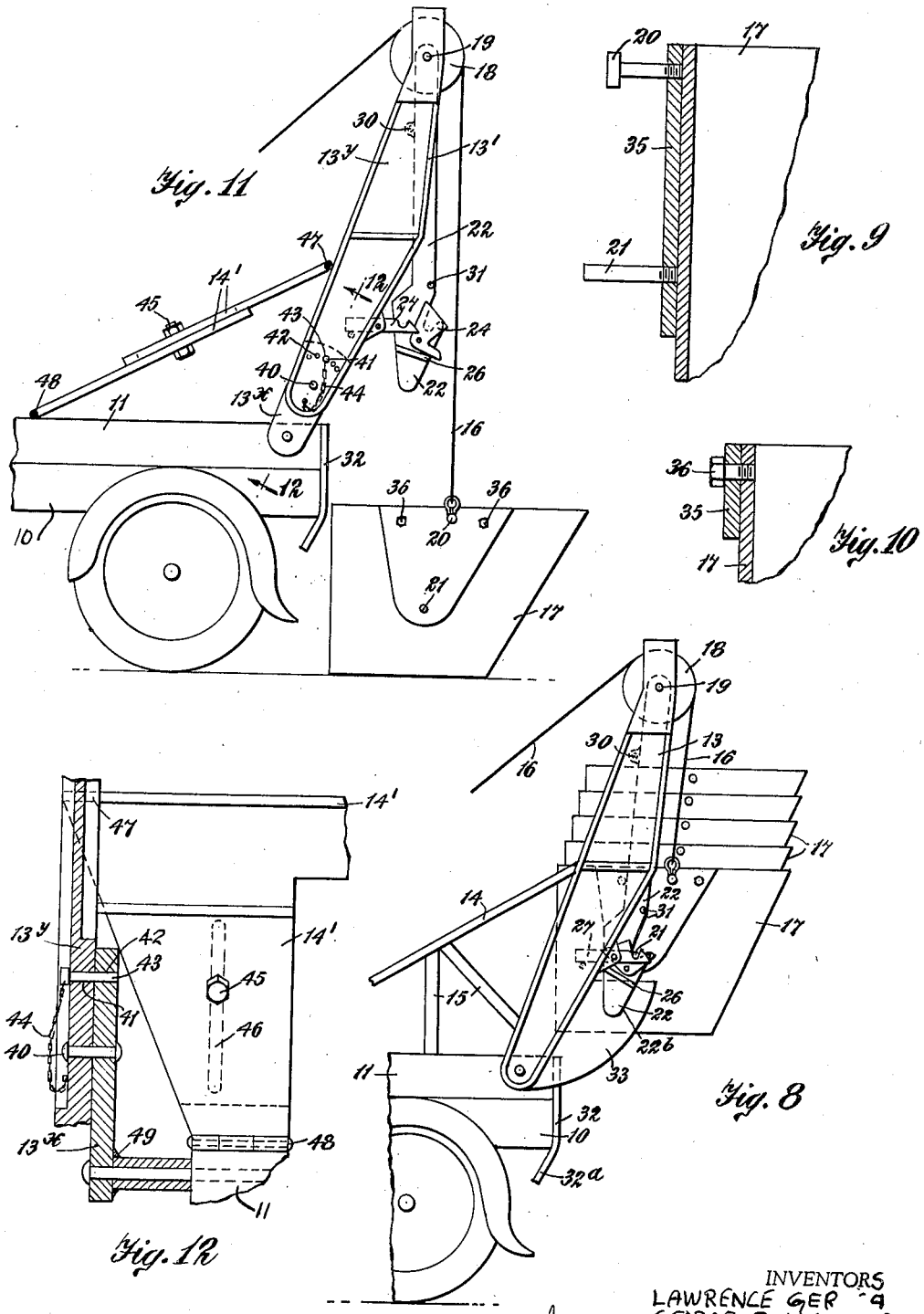

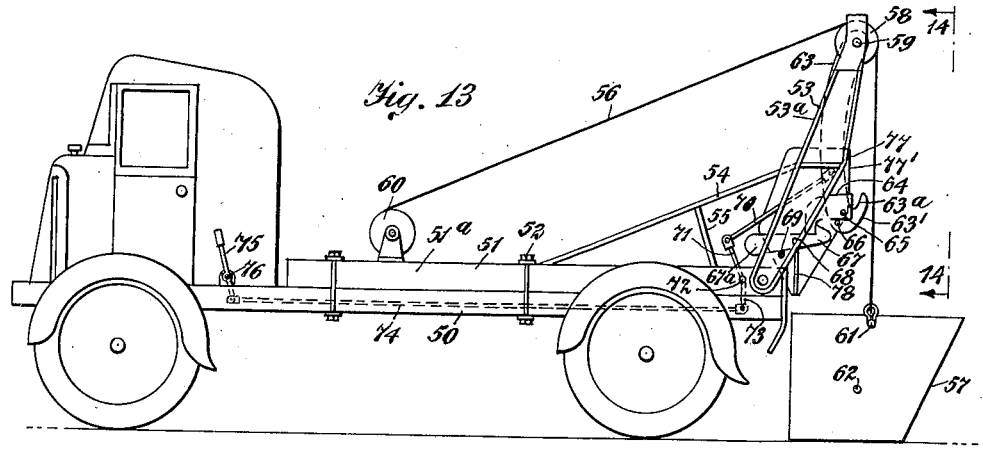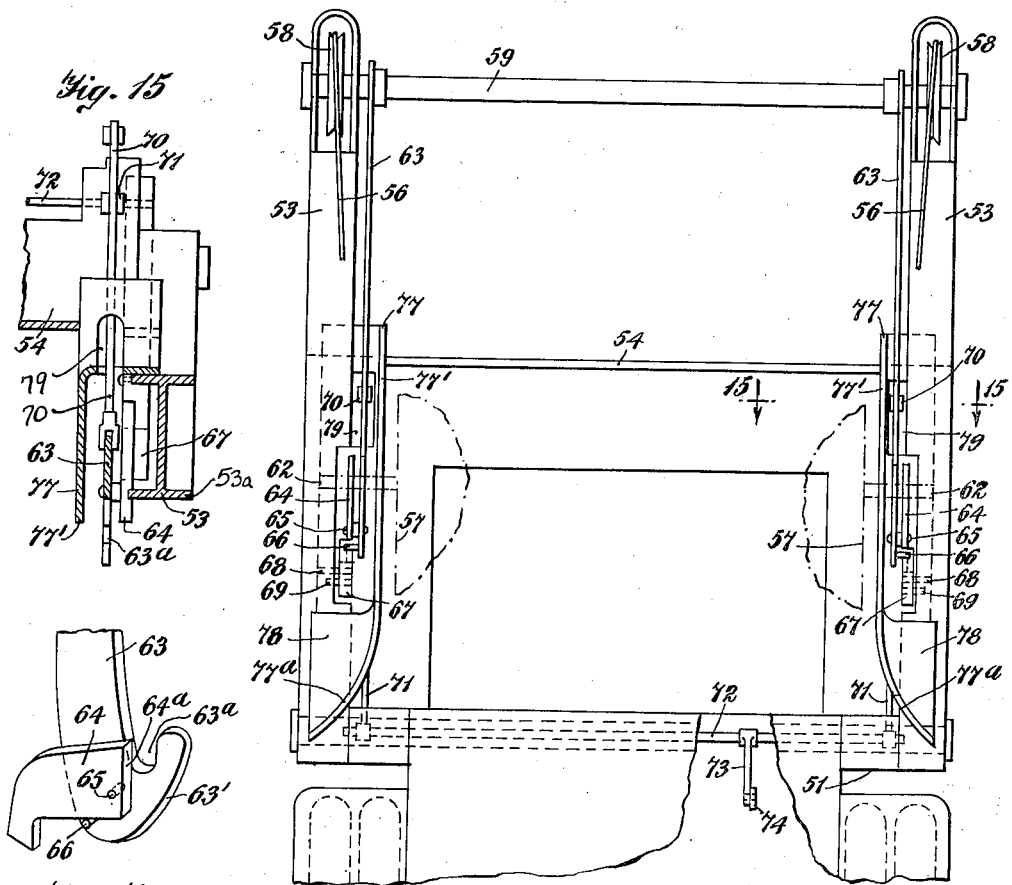

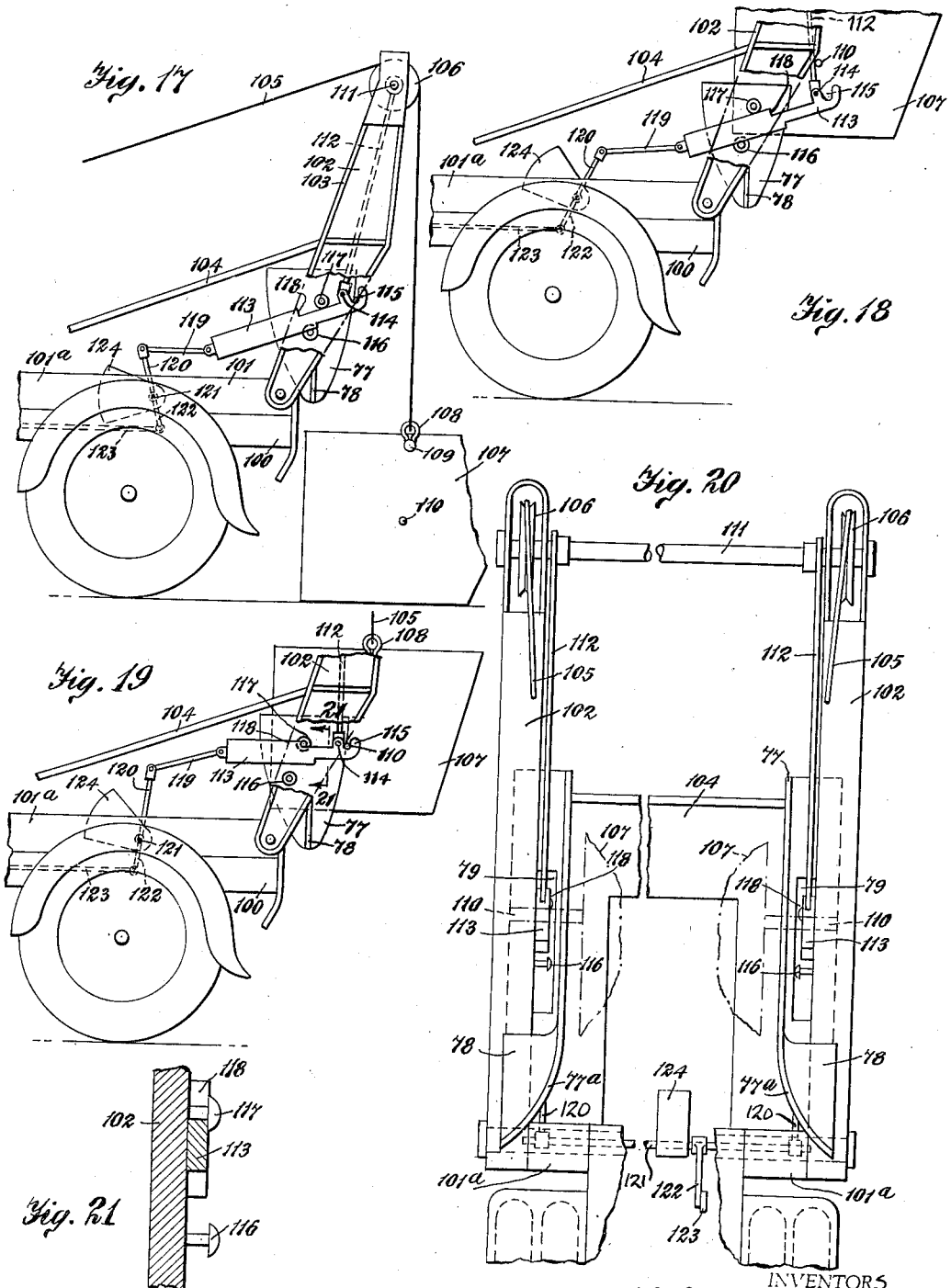

Patented Aug. 13, 1940

2,211,719

UNITED STATES PATENT OFFICE 2,211,719

TRANSPORTING AND DUMPING VEHICLE

Lawrence Gerosa and George P. Wagner, Bronx, N. Y., assignors to Speed-Dump, Inc., New York, N. Y., a corporation of New York Application October 27, 1938, Serial No. 237,226

6 Claims. (Cl. 214—120)

This invention relates to new and useful improvements in a transporting and dumping vehicle.

The invention has for an object the construction of a vehicle as mentioned which is characterized by cable means for hoisting and lowering a skip, a pair of side members pivotally supported at their top portions and adapted to swing freely under the influence of gravity, and an arrangement by which said side members cooperate to support the skip in a novel manner.

More specifically, it is contemplated to provide the side members with hook portions for receiving pegs from the skip, and to arrange cams on the side members in a manner for controlling the engagement and disengagement of the pegs from the hook portions.

Furthermore, it is proposed to provide hooks upon a frame mounted on the vehicle, arranged for holding the skip from swinging forwards and rearwards, and associated with means for controlling the engagement of the bottom pegs in said hooks.

Still further the invention proposes a novel construction of the skip which will permit stacking of at least four skips, one above the other, upon the skip automatically supported on the dumping vehicle. This arrangement will permit cheap transportation of the five skips to a job.

Still further the invention proposes to provide an arrangement by which portions of the said frame may be adjusted to extend further forwards or rearwards relative to the vehicle for the purposes hereinafter more fully described.

The invention further proposes a modification in which the side members are associated with a manual means for the control thereof operable from the cab of the vehicle.

Still further the invention proposes the provision of a novel latch mechanism on the side members and on stationary parts and adapted for holding the bottom pegs of the skip against certain abutments and for automatically opening when said bottom pegs are out of the hook portions of the side members.

Still further the invention proposes to arrange the manual control means operable from the cab in a manner so that the side members may be moved forwards and rearwards, and particularly to positions forwards which prevent the engagement of the bottom pegs of the skip within the hook portions of the side members.

As another object of the invention it is proposed to construct a modified form which is characterized by substantially horizontal bars pivotally mounted upon the lower ends of side members, and having hook portions at the front for receiving the said bottom pegs and supported and connected in a novel manner by which the horizontal bars may be moved forwards and rearwards and locked in a certain position when required.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary side elevational view of a transporting and dumping vehicle constructed according to this invention.

Fig. 2 is a rear elevational view of Fig. 1.

Fig. 3 is a fragmentary plan view of a portion of Fig. 1.

Fig. 4 is a fragmentary enlarged detailed view of a portion of Fig. 1 but illustrated with the skip in a different position.

Fig. 5 is a view similar to Fig. 4 but illustrating the parts in still another position.

Fig. 6 is another similar view but illustrating the parts in still another position.

Fig. 7 is a perspective view of one of the side members and its cam.

Fig. 8 is a fragmentary side elevational view similar to Fig. 1 but illustrating the five skips stacked one above the other ready for transporting.

Fig. 9 is a fragmentary sectional view taken on the line 9—9 of Fig. 1.

Fig. 10 is a fragmentary sectional view on the line 10—10 of Fig. 1.

Fig. 11 is a fragmentary side elevational view of a transporting and dumping vehicle constructed according to a modification of this invention.

Fig. 12 is a fragmentary sectional view taken on the line 12—12 of Fig. 11.

Fig. 13 is a side elevational view of a transporting and dumping vehicle construction to a modification of this invention.

Fig. 14 is a fragmentary rear elevational view of Fig. 13 looking in the direction of the line 14—14.

Fig. 15 is a fragmentary horizontal sectional view taken on the line 15—15 of Fig. 14.

Fig. 16 is a fragmentary perspective view of the lower portion of one of the side arms.

Fig. 17 is a fragmentary side elevational view of a transporting and dumping vehicle constructed according to another modification.

Fig. 18 is a view similar to Fig. 17 but showing the horizontal bars extended completely rearwards and showing the skip in a raised position.

Fig. 19 is a view similar to Fig. 18 but showing the skip supported by the horizontal bars.

Fig. 20 is a rear elevational view of the device.

Fig. 21 is a fragmentary enlarged vertical sectional view on the line 21—21 of Fig. 19.

The transporting and dumping vehicle, according to this invention, includes a motor driven vehicle having a chassis 10. A frame is mounted on the chassis 10 and includes a horizontal frame section 11 secured to the chassis 10 by anchorage bolts 12. At the rear there are a pair of spaced vertical rearwardly extending arm portions 13. These arm portions are reinforced along their sides by flanges 13a to make them rigid and strong. A reinforcement frame section 14 is connected between the arm portions 13 and the frame section 11 to assist in firmly holding the arms. Several braces 15 are used to reinforce the section 14.

Cable means are guided over the arms 13 for hoisting and lowering a skip. This cable means includes a pair of cables 16 for attachment to the sides of a skip 17. The cables 16 extend upwards over pulleys 18 rotatively mounted upon the upper ends of the arms 13. There is a heavy rod 19 which is mounted between the arms 13 and the pulleys 18 are rotatively supported on this rod. The inner ends of the cables 16 must be connected with a winch or other hoisting and lowering device, not shown on the drawings nor described in the specification since such hoisting devices are generally known in the art.

The skip 17 is for the purpose of holding earth or other heavy materials and is adapted to engage between the arms 13. The skip 17 has top pegs 20 at its sides above its center of gravity to which the cables 16 are attached and by which the skip may be hoisted and lowered. The skip 17 is also provided with bottom pegs 21 at the sides thereof slightly forwards and downwards of its center of gravity. These latter pegs are used to assist in supporting the skip during transportation and for assisting in dumping the skip as hereinafter more fully described.

A pair of side members 22 is supported at their top portions on the said rod 19 to swing freely forwards and rearwards under the action of gravity. Each of these side members is formed with a hook portion 22a for receiving the bottom pegs 21 as hereinafter more fully described. A cam 24 is mounted in each side member 22 for controlling the engagement and disengagement of the bottom pegs with the hook portions. Each cam 24 is pivotally supported by a pintle rivet 25. The cam 24 has a hook portion 24a adapted in one position of the cam to be in an exact line with the hook portion 22a. Fig. 5 shows the cam in this position. The cam 24 also has an inclined side 24b adapted to extend across the mouth of the hook 22a as shown in Fig. 7. The cam 24 also has a finger 24c adapted to extend across the hook 22a as shown in Fig. 4. The pivoting of the cam 24 is limited by a strip of material 26 attached upon the side of the side member 22.

Each side member 22 is formed with an upwardly inclined rear edge 22b along which the pegs 21 may move as hereinafter more fully explained.

Hooks 27 are provided for holding the skip from swinging rearwards. These hooks 27 are positioned on the arms 13 and are arranged on a horizontal line with the hook portions 22a. A means is provided for controlling the engagement of the bottom pegs into the hooks 27. This means includes beveled ends 27a formed on the hooks 27, pintles 28 for pivotally supporting the hooks 27, and abutment pins 29 for normally holding the hooks 27 in substantially horizontal positions.

The side members 22 are limited to swing through certain amplitudes only. There are pintles 30 projecting from portions of the side members 22 and adapted to strike portions of the flanges 13a of the arms 13 for limiting rearward swinging of the side members. Other pins 31 project from the sides of the side arms 22 and are adapted to strike the edges of the arms 13 for limiting the side arms 22 from moving further than a predetermined amount forwards.

A baffle plate 32 is attached upon the frame section 11 and extends downwards and has a forwardly turned end 32a to assist in guiding the skip 17 upwards so that the skip does not become caught beneath the chassis 10. There are additional baffle plates 33 attached upon the arms 13 and formed curved when viewed from the rear of the truck (see Fig. 2) for assisting in guiding the skip 17 between the side members 22.

The pegs 20 and 21 are only indirectly mounted upon the sides of the skip 17. These pegs are directly mounted upon plates 35 which in turn are secured upon the sides of the skip 17 by screws 36 or other fastening means. It is customary to supply a set of five skips, with each truck. It is desirable that the truck be capable of transporting the five skips at one time so that one trip may be made to a job. Because of the projecting pegs 20 and 21 it was heretofore only possible to stack two skips together and transport them two at a time. According to this invention it is proposed that the plates 35 be removed from the sides of the skips and that these plates be carried in the skips during transportation. Five skips may be stacked one above the other as illustrated in Fig. 8. It is therefore possible for the five skips to be delivered to a job during one trip of the vehicle.

The operation of the transporting and dumping vehicle is as follows:

Assume that it is desired to hoist the skip 17 of Fig. 1 upwards and to support it properly for transporting. The cables 16 are drawn in by the hoisting mechanism so that the skip 17 moves upwards. The parts are so proportioned that the pegs 21 will strike against the inclined edges 22b of the side members 22 as indicated in Fig. 1 by the dot and dash line showing of the pegs and the skip. The hooks 22 will swing slightly forwards as the pegs 21 travel along the edges 22b. The ends 24c of the cams project slightly past the edges 22b and therefore the cams will be rotated anti-clockwise until they pass a certain dead center and will then fall further anti-clockwise to new positions supported on the strips 26.

Fig. 4 illustrates the new position of the cam 24. When the pegs 21 reach positions above the hooks 22a the skip 17 may be slightly lowered so that the pegs 21 strike the ends 24c of the cams 24. This condition is illustrated in Fig. 4. The cams 24 will now be turned slightly clockwise and the pegs 21 will settle into the hook portions 22a of the side members 22 and the hook portions 24a of the cams 24. In this condition of the cams they are slightly back of the dead center and would fall back to their original positions except for the fact that the pegs 21 prevent this. The pegs 21 are now in the position illustrated in Fig. 5.

The cables 16 are slacked a slight additional amount. There is then the tendency for the pegs 20 to travel in an arc clockwise about the pegs 21 as a center since the pegs 21 are now being supported. This clockwise tendency of the pegs 20 serves to shift the center of gravity of the skip 17 and there is a reaction wherein the lower portion of the skip tends to move forwards. This may be readily seen in Fig. 5 where there is an exaggerated offset relationship shown between the pegs 20 and 21. As the pegs 21 are now being moved forwards they will move towards the hooks 27. They will strike the inclined surfaces 27a of the hooks and pivot the hooks downwards as shown in Fig. 5. They will soon reach a position within the hooks 27 and then the hooks will move back to their original positions. The tail ends of the hooks 27 are heavier than their front ends so that the tail ends tend to drop down upon the pins 29. The hooks are then in their original horizontal positions.

The cables 16 may now be pulled slightly upwards so that the skip is properly supported by the cables and by the various hooks. Fig. 8 shows this condition of the device. Fig. 8 also shows four additional skips mounted with the bottom skip 17.

If it is desired to dump the skip 17 when the device is in the condition shown in Fig. 6 it is merely necessary that the cables 16 be slacked. Then the skip dumps as illustrated in Fig. 6. If it is desired to lower the skip 17 without dumping, the cables 16 are drawn upwards until the pegs 21 disengage from the hook portions. The cams 24 will fall back to their original positions, the position shown in Fig. 7. Then the skip 17 may be lowered since the pegs 21 will ride over the inclined surfaces 24b. The device is now back in the original condition as illustrated in Fig. 1.

It is pointed out that the side members 22, since they are freely depending from the rod 19, will assume the vertical position irrespective of the position of the chassis of the vehicle. For example, the vehicle may be on a hill tilted end forwards or rearwards. The side arms 22 will automatically seek the vertical positions necessary for the proper engagement of the pegs 21 into the hook portions of the side arms. Furthermore, irrespective of the inclination of the chassis of the vehicle the side arms 22 will always swing forwards to any amount necessary to engage the pegs 21 into the hooks 27 when the cables 16 are slightly slackened, as indicated in Fig. 5. The device will therefore operate in all positions in which the vehicle will be on the job.

In Figs. 11 and 12 a modification of the invention has been disclosed which distinguishes from the prior form in an arrangement whereby it is possible to extend the skip 17 further rearwards or forwards as may be required on certain jobs. The wheels of the vehicle may back up only a certain amount from the edge of a hole in the ground. Sometimes it is required that the skips 17 be extended further over the edge of the hole than at other times. For this purpose the side arms 13' are formed from two sections. There are base sections 13x and upper sections 13y pivotally connected with each other by pintles 40. One of the sections, namely the sections 13y, are provided with openings 41 at certain distances from the pintles 40 corresponding with the radii of an arc upon which there are a plurality of openings 42 formed in the other sections. Pegs 43 are supported by chains 44 so that they may not be lost. They are adapted to engage through the openings 41 and one of the openings 42 for holding the top sections 13y at selected positions. The various mechanism, that is the hooks, members, etc., are supported from the top sections 13y as clearly illustrated in Fig. 11.

A reinforcement member 14' formed from adjacent sections adjustably connected by bolts 45 engaging through slots 46, is arranged to reinforce the sections 13y. The outer section of the reinforcement member 14' is connected by hinges 47 to the sections 13y. The inner end of the inner section of the reinforcement member 14' is connected by a hinge 48 to the frame base section 11. It is required that the bolts 45 be loosened while the top sections 13y of the side arms 13' are being extended or retracted. Then the bolts 45 are re-engaged. The bottom sections 13x are rigidly connected with the frame section 11 by welded material, or in any other manner.

In Figs. 13 to 16 inclusive a modified form of the transporting and dumping vehicle has been disclosed which is characterized by a manual control for operating the side members. This vehicle includes a motor driven vehicle having a chassis 50. A frame 51 is mounted on the chassis 50 and includes a horizontal frame section 51a secured on the chassis 50 by bolts 52. At the rear there is a pair of spaced vertical rearward extending arm portions 53. These arm portions are reinforced along their sides by flanges 53a to make them rigid and strong. A reinforcement frame section 54 is connected between the arms 53 and the frame section 51a to assist in firmly holding the arms. Several braces 55 are used to reinforce the frame section 54. Cable means 56 are guided over the arms 53 for raising and lowering a skip 57.

This cable means includes a pair of cables for attachment to the sides of the skip 57. The cables extend upwards over pulleys 58 rotatively mounted in the upper ends of the arms 53. There is a sturdy rod 59 which is mounted between the arms 53 and the pulleys 58 are rotatively supported on this rod. The inner ends of the cables 56 are connected with a winch 60 or other hoisting and lowering device mounted on the frame section 51a.

The skip 57 is for the purpose of holding earth or other heavy material and is adapted to engage between the arms 53. The skip 57 has top pegs 61 at its sides above its center of gravity to which the cables 56 are releasably connected and by which the skip may be hoisted and lowered. The skip 57 is also provided with bottom pegs 62 at the sides thereof slightly forwards and downwards of its center of gravity. These latter pegs are used to assist in supporting the skip during transportation and for assisting in dumping the skip as hereinafter more fully described.

A pair of side members 63 is supported at their top portions on the rod 59 to swing freely forwards and rearwards. Each of these side members is formed with a hook portion 63a at its bottom for receiving the bottom pegs 62 as hereinafter more fully described. A latch mechanism is associated with the side members 63 and the side arms 53 and is adapted for holding the bottom pegs 62 in a particular manner. This latch mechanism includes a hook member 64 pivotally mounted on each side arm 63. Each hook member 64 has a straight side 64a adapted to extend along the front edge of the hook opening 63a. Each hook member 64 is pivotally supported by a pintle 65 engaged through the bottom portion of the side member 63. Another pin 66 is mounted on the side member 63 and holds the hook member 64 in a predetermined position. The pintle 65 is located towards the rear of the hook member so that there is a tendency for the hook member to rotate anti-clockwise as viewed in Figs. 13 and 16. The pin 66 limits this motion.

Normally, the hook members 64 rest upon the pins 66. From these positions they may pivot clockwise provided that the hooks 63a are opened, that is, that the pegs 62 are not in the hooks 63a.

For each hook member 64 there is a complementary hook member 67. These hook members are pivotally supported by pintles 68 mounted upon the arm portions 53. The tail ends 67a of the hook members 67 are heavy so as to tend to cause the hook members 67 to turn anti-clockwise. Pins 69 mounted on the arm portions 53 hold the hook members 67 in predetermined positions. These positions are such that they engage the hook members 64 as illustrated in Fig. 13.

A manually controlled means is provided for moving the side members 63 forwards and rearwards. This means includes a link 70 pivotally connected with each of the side members 63 and in turn pivotally connected with radial arms 71 fixed on a shaft 72 which is normally supported on the frame section 51a. An arm 73 radially projects from the shaft 72 and is connected with a rod 74 which extends forwards to the vicinity of the cab of the motor vehicle. At the cab the rod 74 pivotally connects with the lower end of a lever 75 which is pivotally supported intermediate of its ends by a pintle 76. When the upper end of the lever 75 is forced forwards the side members 63 will be correspondingly moved forwards.

A cover plate 77 is fixedly mounted on the arm portions 53 and extends across the inner faces of the side members 63 for forming a guide for the sides of the skip 57. The lower portions 77a of these cover plates are bent outwards to assist in properly guiding the skip 57 while the skip is being raised. These lower portions 77a are reinforced with ribs 78. Each of the cover plates 77 is formed with an opening 79 through which the links 70 pass. The rear edges 77' of the cover plates 77 form an abutment for the pegs 62 to slide along, as hereinafter more fully described.

The operation of the device is as follows:

The skip 57 may be raised by the winch 60 drawing in the cables 56. As the skip 57 moves upwards it will be properly centered between the arm portions 53; first by the lower portions 77a of the cover plates 77 and then by the cover plates. The pegs 62 will move along the abutment edges 77'. The peg 62 will strike the curved edges 63' of the side members 63 and force the side members forwards out of the path of the pegs so that the pegs 62 may reach positions above the hooks 63a. When these positions are reached, automatically, due to gravity, the side members 63 will move rearwards so that when the skip 57 is slightly lowered the pegs 62 will enter the hook portions 63a.

In the event that the motor vehicle is on a steep incline the pegs 62 may not touch the abutment edges 77' of the cover plates 77. But because the side members are free the pegs 62 will always strike the curved edges 63' and move the side members slightly rearwards so that the pegs 62 assume positions above the hook portions 63a. The latch mechanism, including the complementary hook members 64 and 67 cannot hold the engagement with each other when the pegs 62 are not in the hook portions 63a. This is so in that the hook portions 64 are free to rotate clockwise when the side members 63 swing rearwards. When the skip 57 is slightly lowered so that the pegs 62 engage the hook portions 63a, and the cables 56 are slightly slackened, there will be a tendency for the weight of the skip 57 to pivot the side members 63 forwards until the pegs 62 strike the abutment edges 77'.

During this forward pivoting of the side members 63 the hook members 64 will engage the hook members 67 momentarily pivoting the hook members 67 downwards, and then causing the engagement of the hook members 67 with the hook members 64. The parts are then in the position shown in Fig. 13. The skip 57 is now rigidly supported. It cannot swing rearwards because of the inter-engagement of the hooks 64 and 67. It cannot swing forwards because the pegs 62 are rested against the abutment edges 77'. It cannot swing laterally because of the cover plates 77.

The skip 57 may be dumped by slackening the cables 56 further. This will cause the skip to pivot clockwise and so discharge its contents. The skip may be disengaged from the side members 63 by operating the winch 60 to raise the pegs 62 out of the hook portions 63a. Then the side members 63 may be moved forwards by moving the upper end of the lever 67 forwards. The side members 63 may be moved forwards to positions in which the hook portions 63a are forward of the abutment edges 77'. Now the skip 57 may be lowered since the pegs 62 will pass the hook portions 63a.

In Figs. 17–21 inclusive another modified form of transporting and dumping vehicle has been disclosed which is characterized by a novel control for operating the side members. This vehicle includes a motor driven chassis 100. A frame 101 is mounted on the chassis 100 and includes a horizontal frame section 101a secured upon the chassis and a pair of spaced vertical rearwardly extending arm portions 102. These arm portions are reinforced along their sides with flanges 103 to make them rigid and strong. A reinforcement frame section 104 is connected between the arms 102 and the frame section 101a to assist in firmly holding the arms. Cable means 105 are guided over pulleys 106 mounted upon the arms 102 for raising and lowering a skip 107.

The cables 105 are provided at their rear ends with catch elements 108 adapted to be removably engaged upon pegs 109 mounted on the sides of the skip 107 near the top edge thereof. Bottom pegs 110 project from the sides of the skip 107 to the front of a vertical plane through the center of gravity, and slightly below a horizontal plane passed through the center of gravity.

There is a sturdy rod 111 which is mounted between the arms 102 and the pulleys 106 are normally supported on this rod. The inner ends of the cables 105 are connected with a winch (not shown on the drawings) or other hoisting and lowering device, preferably mounted on the frame section 101a.

A pair of side members 112 is supported at their upper portions on the rod 111 to swing freely forwards and rearwards. Substantially horizontal bars 113 are pivotally mounted by pintles 114 on the lower ends of the side members 112. These bars 113 are formed with hook portions 115 at the front for receiving the bottom pegs 110 as hereinafter more fully described. The rear portions of the bars 113 are sufficiently large so as to normally tend to cause the rear portions to fall downwards. These rear portions are supported by pegs 116 projecting from the side arms 102. These pegs are formed with heads (see Fig. 21) which are adapted to engage the faces of the horizontal bars to slidably support them. Other pegs 117 project from the side arms 102 and are arranged above the bars 113 and serve to assist in slidably supporting the bars, and furthermore form an abutment as hereinafter more fully described. These pegs 117 also have heads (see Fig. 21) for engaging the outer faces of the horizontal bars.

Each horizontal bar 113 is formed with a recessed portion at its top producing a shoulder 118. These shoulders are adapted to engage behind the pegs 117 in the manner illustrated in Fig. 19. A means is provided for urging the said horizontal bars 113 into extreme forward positions. This means includes links 119 pivotally connected with the front ends of the bars 113 and also pivotally connected with radial arms 120 fixed on a shaft 121 rotatively mounted on the frame section 101a. Another radial arm 122 is mounted on a shaft 121 and extends downwards and connects with a rod 123 extending to the front of the vehicle, particularly to the cab thereof. This rod is adapted to be connected with a lever similar to the rod 74 illustrated in Fig. 13 so that the rod may be conveniently moved forwards and rearwards.

A counterweight 124 is mounted upon the shaft 121 and normally tends to turn the shaft into a position in which the horizontal bars 113 are in their extreme forward positions. This condition of the horizontal bars is illustrated in Fig. 17. In this figure the rear ends of the horizontal bars 113 are forward of the rear edges of the vertical arms 102.

The operation of the device is as follows:

To support the skip 107 it is first required that the cable means 105 be operated to raise the skip to a position in which the bottom pegs 110 are above the horizontal bars 113. Then the device is manipulated to move the bar 123 forwards so that the shaft 121 turns and through the connection of the links 119 moves the horizontal bars 113 rearwards to the positions shown in Fig. 18. The bars are moved rearwards until the side members 112 strike the bottom pegs 110. The skip 107 is then lowered and the side members 112 guide the bottom pegs 110 into the hook portions 115. The skip is then further lowered and there will be a tendency for the skip to force the horizontal bars 113 forwards and to simultaneously turn the bars about the pintles 114 as pivots. Soon the parts will reach the position shown in Fig. 19 in which the weight of the skip 107 (loaded or empty) raises the rear ends of the bars 113, engaging the top edges thereof against the pegs 117 and the shoulders 118 will engage the pegs 117 to hold the horizontal bars 113 from moving forwards. The bottom pegs 110 at this time are resting against the rear edges of the side arms 102 (see Fig. 19) and so the side bars 113 are held from moving forwards. The skip 107 is now supported ready for transportation.

The skip 107 may be dumped by slackening the cables 105. The skip may be removed from the vehicle without dumping by drawing upon the cables 105. As soon as the bottom pegs 110 are lifted out from the hooks 115 the counterweight 124 will turn the shaft 121 and through the link system 120, 119 the side bars 113 will be moved forwards to their initial positions shown in Fig. 17. The cable means 105 may now be slackened and the skip lowered. It is pointed out that the bottom pegs 110 of the skip will miss the rear ends of the horizontal bars 113 and thus there is no interference in the lowering of the skip.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit or the scope of the appended claims.

Having thus described our invention, what we claim as new and desire to secure by United States Letters Patent is:

1. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, and means for controlling the engagement of said bottom pegs in said hooks, said cams being pivotally mounted and being adapted to fall forwards or rearwards past a fixed or certain dead center, to one side of said dead center said cams being provided with hook portions alignable with the hook portions of said side members and in these aligned positions being adapted to fall rearwards into original positions, said cams having extended rear ends engageable by the bottom pegs of the skip for moving the cams past their dead centers to fall forwards.

2. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, and means for controlling the engagement of said bottom pegs in said hooks, said cams being pivotally mounted and being adapted to fall forwards or rearwards past a fixed or certain dead center, to one side of said dead center said cams being provided with hook portions alignable with the hook portions of said side members and in these aligned positions being adapted to fall rearwards into original positions, said cams having extended rear ends engageable by the bottom pegs of the skip for moving the cams past their dead center to fall forwards, said cams having inclined top sides to close the other portions of the side arms when they are in their forward positions.

3. A transporting and dumping vehicle, comprising a motor driven vehicle having a chassis, a frame mounted on the rear portion of said chassis and having a pair of spaced verticle rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, and means for controlling the engagement of said bottom pegs in said hooks, comprising inclined ends upon said hooks for engagement by the bottom pegs to force the hooks downwards, and means for holding the hooks so that they may normally move downwards.

4. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, and means for controlling the engagement of said bottom pegs in said hooks, comprising inclined ends upon said hooks for engagement by the bottom pegs to force the hooks downwards, and means for holding the hooks so that they may normally move downwards, and means for returning the hooks back into their original positions.

5. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, means for controlling the engagement of said bottom pegs in said hooks, and means for limiting the amplitude of swinging of said side members.

6. A transporting and dumping vehicle, comprising a motor driven vehicle having a chassis, a frame mounted on the rear portion of said chassis and having a pair of spaced vertical rearwardly extending arms, a skip for holding earth and other heavy materials and adapted to engage between said arms and having top pegs at its side above the center of gravity of the skip by which the skip may be hoisted and having bottom pegs at its sides slightly forwards and downwards of the center of gravity, cable means guides over said arms and attached to said top pegs to hoist and lower said skip in a way so that the skip is free to swing forwards and rearwards, a pair of side members pivotally supported at their top portions on said arms to swing freely forwards and rearwards and having hook portions for receiving said bottom pegs, said hook portions having upwardly and rearwardly inclined edges to be engaged by the said bottom pegs when said skip is hoisted so that the side members are moved forwards until the bottom pegs reach positions above the hooks, cams mounted on said side members for controlling the engagement and disengagement of said bottom pegs with said hook portions by controlling forward and rearward swinging of said skip, hooks for holding the skip from swinging rearwards when the bottom pegs engage therein and in the hook portions of said side members mounted on said frame on a horizontal line with said hook portions, and means for controlling the engagement of said bottom pegs in said hooks, said arms being formed from separate sections, means for movably connecting said sections, and means for holding said sections in various fixed positions.

LAWRENCE GEROSA,
       GEORGE P. WAGNER.